United States Patent
Daiss et al.

(10) Patent No.: US 6,659,011 B1
(45) Date of Patent: Dec. 9, 2003

(54) DEVICE FOR TRIGGERING AN AIRBAG

(75) Inventors: Michael Daiss, Filderstadt (DE);
Klaus-Dieter Löwen, Balingen (DE);
Matthias Reinhardt, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/070,659

(22) PCT Filed: Aug. 24, 2000

(86) PCT No.: PCT/EP00/08244

§ 371 (c)(1),
(2), (4) Date: Jul. 10, 2002

(87) PCT Pub. No.: WO01/17823

PCT Pub. Date: Mar. 15, 2001

(30) Foreign Application Priority Data

Sep. 8, 1999 (DE) .......................... 199 42 815

(51) Int. Cl.⁷ .................................. F42B 3/18
(52) U.S. Cl. ................. 102/202.2; 280/741; 102/202.1
(58) Field of Search .......................... 102/202.1, 202.2, 102/202.3, 202.4, 530, 531; 280/741

(56) References Cited

U.S. PATENT DOCUMENTS

| | | | | |
|---|---|---|---|---|
| 3,148,619 A | * | 9/1964 | Holinbeck | 102/202.2 |
| 3,185,093 A | * | 5/1965 | Holinbeck | 102/202.2 |
| 3,414,292 A | * | 12/1968 | Oldberg et al. | 280/740 |
| 4,273,051 A | * | 6/1981 | Stratton | 102/202.2 |
| 4,304,184 A | * | 12/1981 | Jones | 102/202.13 |
| 4,592,280 A | * | 6/1986 | Shores | 102/202.2 |
| 6,302,023 B1 | | 10/2001 | Wier | |
| 6,324,987 B1 | | 12/2001 | Wier | |

FOREIGN PATENT DOCUMENTS

| | | | |
|---|---|---|---|
| DE | 41 36 248 | 5/1993 | |
| DE | 44 13 756 | 7/1995 | |
| DE | 297 09 390 | 11/1997 | |
| DE | 299 00 178 | 4/1999 | |
| EP | 0 655 754 | 5/1995 | |
| FR | 2586800 A1 | * 3/1987 | ............. F42B/3/18 |

OTHER PUBLICATIONS

International Search Report.
German Office Action.

* cited by examiner

*Primary Examiner*—Michael J. Carone
*Assistant Examiner*—Gabriel S Sukman
(74) *Attorney, Agent, or Firm*—Crowell & Moring LLP

(57) ABSTRACT

A device for triggering an airbag having a controller, a trigger, electric lines between the controlled device and the trigger and a coil for attenuating high-frequency interference currents connected to the electric lines which in turn induces interference current into the lines as a result of an external magnetic alternating field. The attenuation of the induced interference current results from an external magnetic alternating field of the coil and a compensating coil is connected in the electric lines and arranged in the surrounding area of the coil so that the amount of current induced in the compensating coil is equal to that of the interference current induced in the coil by the external field and because they are in anti-phase, the resultant current is zero from any interference.

15 Claims, 2 Drawing Sheets

DEVICE FOR TRIGGERING AN AIRBAG

BACKGROUND AND SUMMARY OF THE INVENTION

This application claims the priority of German Application No. 199 42 815.8, filed Sep. 8, 1999 and International Application No. PCT/EP00/08244, filed Aug. 24, 2000, the disclosures of which are expressly incorporated by reference herein.

The invention relates to a device for actuating an airbag having a controller, a firing device for firing the airbag and electric leads which connect the controller to the firing device, a coil for damping high-frequency interference currents being connected into the electric leads, which coil can in turn induce interference currents in the leads to the firing means if an external electromagnetic interference field is present.

For actuating airbags in motor vehicles, circuits are known which have a controller via which a firing device for firing the airbag is actuated. A firing device and be firing caps which fire, for example, a gas cartridge if the actuation current at the input of the firing cap exceeds a threshold value.

In order to attenuate the interference currents which were induced in the electric leads by strong electromagnetic fields, a coil is already connected into the electric leads between the controller and the firing cap. The coil reduces, in particular, high-frequency interference currents in the leads. The coil is electrically connected to the firing cap in such a way that the length of the electric leads is at a minimum. In the case of an external magnetic field, not generated by the coil itself, the coil induces interference currents in the electric leads. The behaviour is comparable to the secondary winding of a transformer if the magnetic flow flowing through the core is considered as the external electromagnetic field.

German Patent DE 299 00 178 U1 discloses a seat-belt pretensioning device with a gas generator, in which a circuit with a coil is provided within a cylindrical housing, as a result of which relatively high frequency interference signals cannot get to the ignition system.

German Patent DE 4 136 248 A1 discloses a coil plug which has two coils wound in opposite directions around the same core within a plug housing. The coils are arranged in electric leads which are independent of one another, neither the wiring nor the function of the two coils being explained in more detail.

The object of the present invention is to configure and develop a device of the type mentioned above in such a way that the external effects of a magnetic field on the coil are compensated and, as a result, the interference currents in the leads are reduced.

Accordingly, in order to compensate the interference current caused by the external magnetic field in the coil, a compensation coil is connected into the electric leads and arranged in the vicinity of the coil in such a way that the induced compensation currents caused as a result of the external magnetic field in the compensation coil are opposed to the interference currents. As a result, the currents caused by the external magnetic field cancel one another out and in addition, as in the prior art also, the high-frequency currents within the electric leads are filtered out.

According to the invention it has been recognized that the influence of an external magnetic field in the coil can be advantageously compensated by a compensation coil. Here, in addition, by virtue of suitable dimensioning, the high-frequency currents in the electric leads are reduced by the alternating current resistance of the coils connected in series, as was already the case when there was only one coil. At the same time, the coils which are arranged antiparallel considerably reduce the overall interference currents in the coil which are induced as a result of an external magnetic field. The compensation coil thus reduces the negative effects which are produced owing to the external interference field.

The coil and the compensation coil are preferably provided in the same lead and connected in series there. As a result, the external electromagnetic field in the two coils generates the currents which are the same, but act in opposite directions. By means of the dimensioning, embodiment and arrangement of the coils, it is then possible for the currents, which are induced by the external interference field, to be directed in opposite directions and have the same strengths so that they cancel one another out. Therefore, an external interference field does not result in any additional interference currents at the load to be protected, in particular a firing cap. As a result of the arrangement of the coils, the high-frequency interference currents in the leads and the currents induced by an external magnetic field in the coil are minimized.

The compensation coil is preferably arranged antiparallel with respect to the coil. Because the two coils are connected in series, the windings of the two coils then run with respect to one another in such a way that coil fields in opposite directions are produced. For this purpose, on the one hand, the height of the winding and on the other hand the sense of the winding in the winding direction can be adapted.

In order to change the induced current and thus determine the compensation behaviour of the compensation coil, the material of the coil core or the orientation of the coil winding or the number of windings can be adapted. Because the same current flows through the windings of the two coils because the series connection of the coils, the coil field is preferably adapted by means of the parameters mentioned above. For this reason, the induced total current of differently wound coils can still compensate one another (become zero) if, for example, different materials are used for the two coils and their electromagnetic fields are tuned for compensation.

In another development of the invention, the coil core is embodied as a closed core around which either the coil or the compensation coil or both coils are wound. When only a single annular core is used, the coil and the compensation coil can be combined to form a composite coil so that only the composite coil is wound around the annular core. The coil core is in particular embodied as an annular core. The annular core can have here a circular cross section or a cross section which is essentially rectangular, the annular core being cylindrical. The annular core then has the shape of a torus which is approximated to a lateral surface of a cylinder. In this case, a coil winding is not essentially circular but rather of rectangular or oval construction in accordance with the cross section.

With respect to an embodiment with two annular cores it has been found that when there is one coil wound on the first annular core and one compensation coil wound on the second annular core, the two coils are each provided only on one half of an annulus. If, given annular cores which are arranged in parallel one next to the other, they are considered in the direction of their common axis, the coil on the front annular core is, for example, wound in the viewing direction only around the right-hand side of the annulus and the compensation core on the rear annular coil is wound only around the left-hand side of the annulus.

The winding heights, i.e. the pitches of the windings, are arranged at an equal distance from one another. As a result, the induced total current as a result of an external magnetic field is effectively eliminated. For an optimum function, the pitches of the windings must be arranged at the same distance from one another, specifically over the entire casing of the core. Any deviation from this uniform winding degrades the desired compensation result.

In a particularly preferred development of the invention, a plug is provided in the leads between the controller and the firing means and a coil is arranged within the plug or in the region of the plug. The coil can be arranged within an insulating material, specifically even on the outside of the plug, but an arrangement of the coil within the housing of the plug is of particular advantage. In this case it is particularly advantageous to encapsulate the coil. For this purpose, the housing can be adapted to the outer shape of the coil. Depending on the outer shape of the coil, the housing is then essentially cylindrical or cuboid and/or for example also water-repellent.

According to the invention, the coil and the compensation coil can be arranged within the housing of the plug. It is then best to construct the housing of the plug in two parts and can be opened out when it is equipped with plug parts. Both coils can be arranged within the housing with axes which are parallel with one another. For this purpose, two closed or interrupted annular cores can be arranged adjacent to one another. The coil can be wound around an annular core and the compensation coil can be wound around the other annular core, and both coils can be insulated from one another within the housing. Because both coils are connected in series, a lead is first wound around a coil core in order to form a coil and then around the other coil core in order to form the other coil, or the compensation coil. Both coils can be wound on half a side in the viewing direction parallel to the common axis of the annular cores, and offset laterally with respect to one another. As a result, the capacitive coupling of the two coils is reduced. This is advantageous if the interference currents are coupled in the region of the feeder line to the coils and a sufficiently good damping of the interference is to be achieved.

As indicated previously, it is, however, also possible to provide just one annular core onto which a composite coil is wound, said composite coil forming the coil in one part and the compensation coil in the other part. The effects generated by an external field in the part of the composite coil which forms the compensation coil eliminate the effects formed by the same external electromagnetic field in the other part of the composite coil. The other part of the composite coil forms here the coil which was originally provided for filtering the high-frequency currents.

BRIEF DESCRIPTION OF THE DRAWING

There are various possible ways of advantageously configuring and developing the teaching of the present invention. For this purpose, on the one hand, reference should be made to the subordinate claims and, on the other hand, to the following explanation of a plurality of embodiments. In the drawings, in each case in a schematic representation.

DETAILED DESCRIPTION OF THE PREFERRED EMBODIMENT

Figure 1:
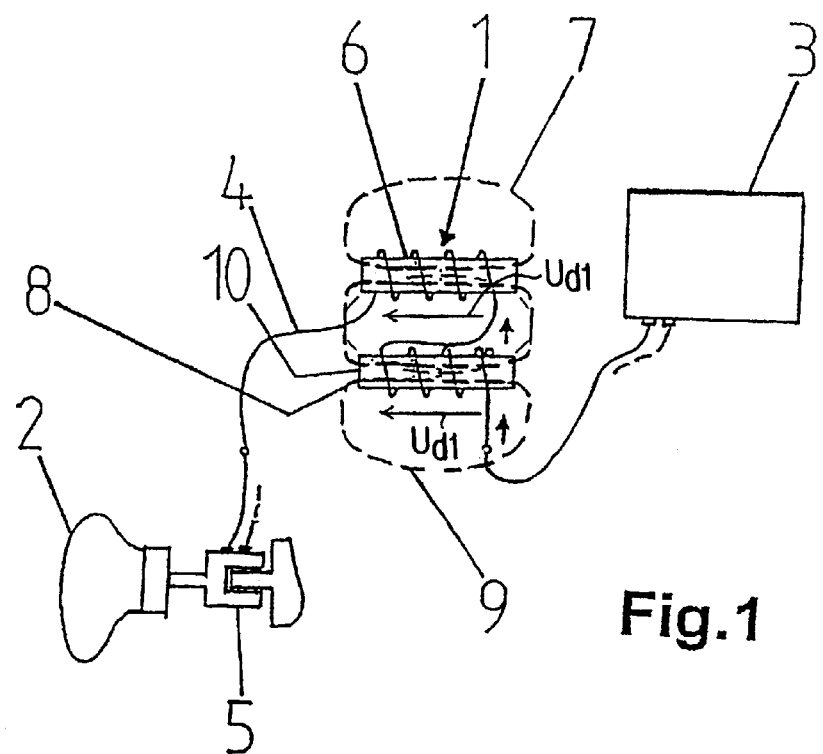
FIG. 1 shows a view of the coil which is provided in the electric lead and has an electromagnetic field and compensation coil which is arranged antiparallel with respect thereto and has an opposing field according to the present invention.

The device 1 for actuating an airbag 2 has a controller 3 which is connected via electric leads 4 to a firing cap 5. The firing cap 5 fires the airbag 2 if the current flowing through it exceeds a limiting value. A coil 6 which is intended to dampen the interference currents on the electric leads 4 is provided in the electric leads 4 between the controller 3 and the firing cap 5.

The interference currents are generated mainly by coupling of electromagnetic fields into the electric leads 4. These are usually high-frequency interference currents. The internal resistance of the coil 6 rises linearly with the frequency of the interference currents so that the flow of current through the coil 6 is restricted at high frequencies. Here, the coil 6 itself induces interference currents in the electric leads 4 if an external interference field is present.

A compensation coil 8 is arranged adjacent to the coil 6 and is oriented with respect to it in such a way that, in the presence of an external magnetic field, a current which is directed in the opposite direction to the megnetic field current, and with the same magnitude, is induced so that the induced total current becomes zero. Here, the compensation coil 8 is connected to the coil 6 in such a way that its damping effect with respect to high-frequency interference sources in the leads 4 is not cancelled out but rather increased. The compensation coil 8 is provided in the same way as the coil 6 in terms of number of turns, material and embodiment. The compensation coil 8 is dimensioned so that the damping effect on the high-frequency interference currents is not cancelled. In addition, the coil 6 and the compensation coil 8 are connected and arranged in such a way that in the case of an externally applied magnetic field, no current is induced in the electric leads 4 to the firing cap. The two coils 6 and 8 are connected to one another in such a way that the sum of the induced voltages of the coils which are connected in series becomes zero. As a result, further interference currents are not generated in the electric leads 4.

In the embodiment illustrated in FIG. 1, both coils 6 and 8 are oriented precisely antiparallel with respect to one another, and therefore have windings in the same direction but with a reversed connection sequence, and are electrically connected to one another. This arrangement is also referred to according to the invention as antiparallel series connection of the coil 6 and of the compensation coil 8. The requirement for parallel orientation with extremely small spacing is necessary because in the case of a non-homogenous field the differences in the current flowing through the two coils 6 and 8 is as small as possible.

Figure 2:
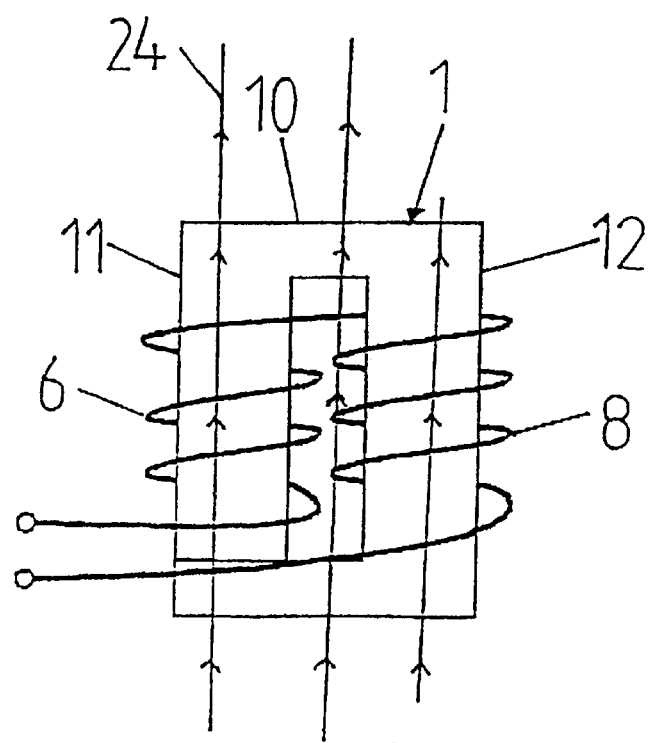
FIG. 2 shows a view of an annular core with a coil which is wound thereon and a compensation coil according to a first embodiment of the present invention.

In FIG. 2, the coil 6 and the compensation coil 8 are wound on a common closed coil core 10. The coil 6 is wound around a limb 11 and the compensation coil 8 is wound around a limb 11, lying opposite, of the closed coil core 12. Both coils 6 and 8 are correspondingly wound in the same direction with antiphase actuation. The external interference field is designated by 24.

According to the described arrangement it is possible to achieve a significant reduction in the coupling of external electromagnetic alternating fields 24, in practice, by a reduction by at least a factor of 8. In order to prevent the resonance frequency of the two coils 6,8 being displaced towards relatively low frequencies in comparison to one coil, the inductance of the two coils 6,8 in the double-inductor embodiment can be half the value of the inductance of the single-inductor embodiment.

Figure 3:
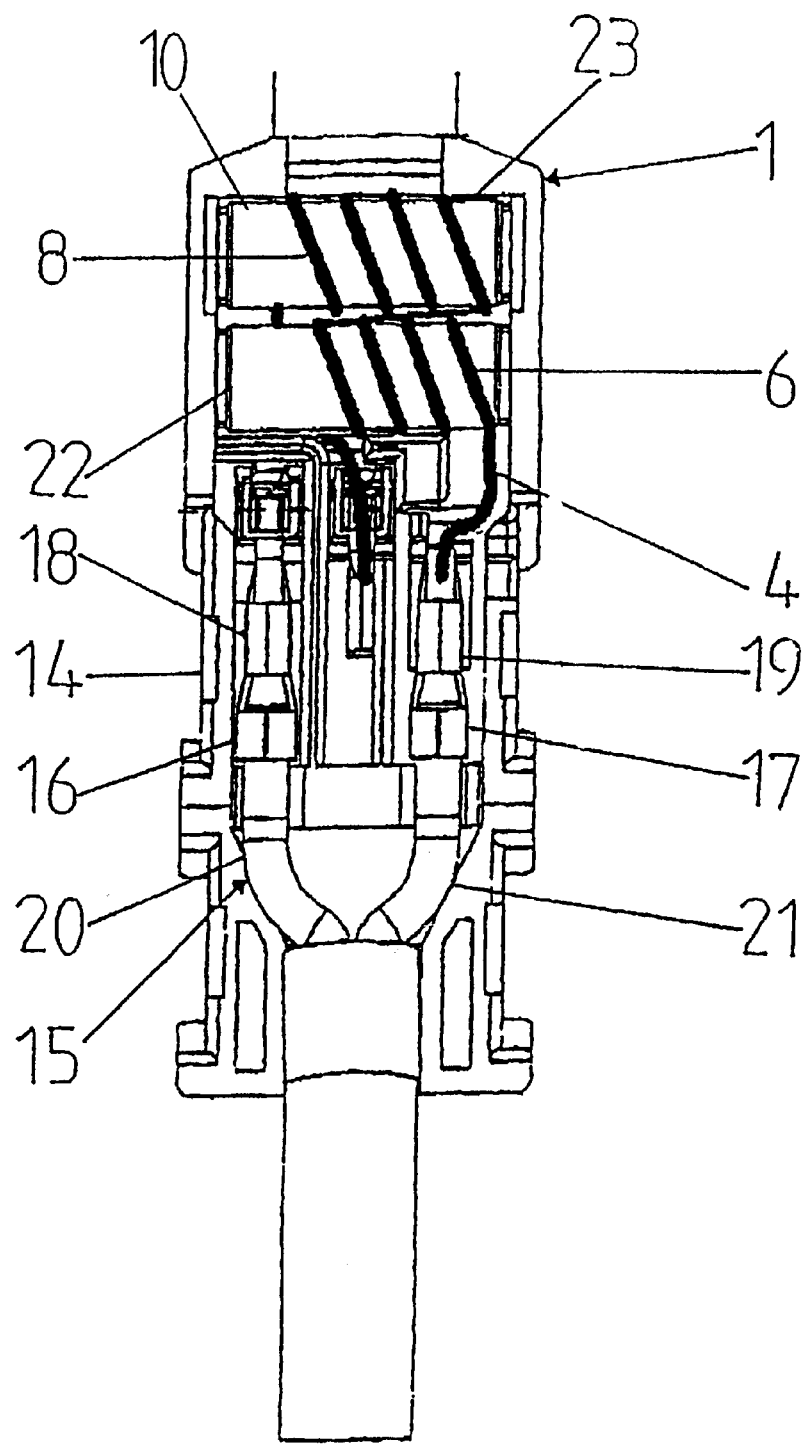
FIG. 3 shows a plan view of an opened housing of a plug part with plug contacts, a coil and a compensation coil according to a third embodiment of the present invention.

Finally, FIG. 3 also shows an embodiment for a motor vehicle such as is used in conjunction with an airbag. The coil 6 and the compensation coil 8 are provided within a housing 14 of a plug-type connector 15 which is arranged between the controller 3 and the firing cap 5. In addition, in each case, a plug contact 16,17 and the corresponding sockets 18 and 19 of two separate leads 20,21 are arranged within the housing 14. The two coils are connected into an electric lead 21, in series. The coil 6 and the compensation coil 8 are wound onto separate coil cores 22 and 23 which are arranged in parallel with one another. The coil axes in this embodiment are arranged in parallel with one another and the winding is provided again in the same direction around both cores, but is actuated in antiphase. The housing of the plug-type connector in this embodiment is very compact and is designed so as to be capable of being opened out in order to facilitate the equipping process.

What is claimed is:

1. A device for actuating an airbag comprising:
   a controller,
   a firing means for firing the airbag,
   electric leads which connect the controller to the firing means,
   a damping coil connected into the electric leads for damping high-frequency interference currents, said coil inducing interference currents in the leads to the firing means in the presence of an external electromagnetic interference field,
   a compensation coil connected into the electric leads in order to reduce the influence of the external electromagnetic interference field and wherein said compensation coil is arranged in the vicinity of the damping coil in such a way that the induced current of the compensation coil counteracts the interference current induced by the external interference field in the damping coil, and wherein one end of the damping coil is electrically connected to one end of the compensation coil wherein the damping coil and the compensation coil are connected in series in the same electric lead.

2. The device according to claim 1, wherein, as a result of the arrangement of the compensation coil with respect to the damping coil, the suppression of the coupled electromagnetic interference fields is not adversely influenced in comparison with an arrangement with only said damping coil without said compensation coil.

3. The device according to claim 1, wherein the compensation coil is arranged in the same winding direction and with antiphase actuation, with respect to the damping coil.

4. The device according to one of claim 1, wherein the damping coil and the compensation coil have a coil core which is at least one of made of the same material, and has the same coil winding orientation and has the same number of coil windings.

5. The device according to one of claim 1, wherein a coil core is provided around which the damping coil and the compensation coil are wound.

6. A device for actuating an airbag comprising:
   a controller,
   a firing means for firing the airbag,
   electric leads which connect the controller to the firing means,
   a damping coil connected into the electric leads for damping high-frequency interference currents, said coil inducing interference currents in the leads to the firing means in the presence of an external electromagnetic interference field,
   a compensation coil connected into the electric leads in order to reduce the influence of the external electromagnetic interference field and wherein said compensation coil is arranged in the vicinity of the damping coil in such a way that the induced current of the compensation coil counteracts the interference current induced by the external interference field in the damping coil, and wherein one end of the damping coil is electrically connected to one end of the compensation coil, wherein the coil core is embodied as a closed core.

7. The device according to claim 6, wherein the closed coil core is embodied as a cylindrical ring.

8. The device according to claim 6, wherein the pitches of the coil windings are one of equal magnitude and are distributed uniformly over the entire core casing.

9. The device according to claim 6, wherein a plug-type connector is provided in the leads between the controller and the firing means, and at least one of the coils is arranged in the region of, the plug-type connector.

10. The device according to claim 9, wherein the housing of the plug-type connector is essentially cylindrical or cuboid.

11. The device according to one of claim 9, wherein the plug is at least of multi-part construction and the damping coil and the compensation coil are arranged within a plug part of the plug-type connector.

12. The device according to claim 9, wherein the two coils are arranged within the plug part with the two coil axes arranged parallel to one another.

13. The device according to claim 6, wherein at least one of the coils is arranged within the housing of the firing means.

14. The device according to claim 6, wherein the coils are arranged so that they fit snugly within a housing.

15. The device according to claim 6, wherein the electric lead from a contact of a plug-type connector is first wound around a coil core in order to form the core and then around a second coil core arranged parallel thereto in order to form the compensation coil.

\* \* \* \* \*